WOUND-WIRE STORAGE BATTERY GRID AND PROCESS

This invention relates to grids for storage battery electrode plates. Such grids support the plate's active material and enhance conductivity through the plates. More particularly, this invention relates to a wound-wire storage battery grid and a process for manufacturing a continuous strip thereof from continuous lengths of wire. Lead-acid storage battery grids are principally commercially made by casting the grids, usually in pairs, from appropriate lead alloys. The cast grids are then separately pasted which requires the mid-process handling of a multitude of discrete parts. Likewise, the thusly cast grids contain more metal than is necessary to provide conductivity. To reduce the weight and metal content of grids, it has been proposed to form a composite between a fanned current collector and a plastic support member. Such a composite may be found in Helms U.S. Pat. No. 3,269,863 filed (8/30/66) and Wheadon et al., U.S. Pat. application Ser. No. 780,068, filed Nov. 29, 1968 and assigned to the assignee of this invention. Likewise, it has been proposed to punch grids from a continuous strip of plastic and flame-spray the plastic to render it conductive. In this regard, see Willmann et al., U.S. Pat. application Ser. No. 25,630, filed Apr. 6, 1970 and assigned to the assignee of this invention. This latter approach was directed toward providing lightweight grids which could be pasted as a continuous strip rather than as individual grids or grid pairs. The problem has been to find the right combination of ingredients which could produce a continuous strip of grids for process ability while at the same time result in individual plates which would meet industry performance norms.

It is an object of this invention to produce continuous strips of wound-wire battery grid segments from continuous lengths of wire and thermoplastic coated reinforcing filaments which grid segments, when separated from the strip, form plates meeting commercially acceptable levels of performance. This and other objects and benefits of this invention will become more apparent from the detailed discussion of the process and drawings which follow: In this regard, FIG. 1 is a perspective view of a portion of one embodiment of a strip of grids formed in accordance with this invention;

FIG. 2 is an end view of the FIG. 1 strip taken along the lines 2—2;

FIG. 3 is a plan view of an apparatus for manufacturing the grid strip of FIG. 1 in accordance with the process of this invention;

FIG. 4 is a sectioned perspective view of a grid-forming block usable in conjunction with the apparatus depicted in FIG. 3;

FIG. 5 is an enlarged, side elevation of a portion of the apparatus shown in FIG. 3;

FIG. 6, in plan view, depicts, stepwise, the grid-forming sequence of the blocks of FIG. 4 as they rotate through the apparatus of FIG. 3 to perform the process of this invention;

FIG. 7 is a perspective view of another grid-forming block embodiment used with the apparatus of FIG. 8;

FIG. 8 is a partial plan view of another embodiment of an apparatus for manufacturing grid strips in accordance with the process of this invention; and FIG. 9 is a plan view of one embodiment of a finished grid segment cut from a strip prepared according to this invention.

With reference to FIGS. 1 and 2, a two-grid segment portion of a grid strip 2 is shown. This embodiment of grid strip 2 has a plurality of wound metal wires 4 fusion-bonded at joints 14 to reinforcing, nonconductive filaments 8. In this embodiment, a number of the filaments 8a lie on one side and a number of filaments 8b on the other side of the wires 4. The reinforcing filaments 8 have a thermoplastic coating 12 thereon. Periodically, during processing, the wires 4 are gathered to one side of the strip to form a cluster of nested wire loops 6 which serve as conductive lugs for joining the grids to like grids in a completed cell.

With reference to FIGS. 3 and 4, one embodiment of a process is described for making the grid strip of FIGS. 1 and 2. A carrousel-like machine 15 has an oval track 16 about an island 17. The track 16 is filled with a number of grid-forming blocks 18 which continuously circulate around it. The blocks 18 (FIG. 4) have an upper working face where the wires 4 and filaments 8 are manipulated in a winding and gathering fashion to form a predetermined grid pattern. A plurality of depressible pilot pins 22 are biased upwardly through the face of block 18 by springs 20. A gathering pin 24 is affixed to a slide 26 which together traverse the length of the block 18 in the track 28 and between the pilot pins 22 in the manner indicated. The direction of motion of the gathering pin is controlled by appropriate cams, not shown, located in the block 18 and track 16. A pair of cam-actuated jaws 30 provide means for grasping and crimping the looped wires 6 during the lug-forming steps. The jaws rotate about the pivots 32 in response to camming actions against the pins 33. Undercut fingers 34 at the extremities of the jaws 30 grip and crimp the loops 6 without causing the wires at the neck 7 of the loop 6 to stack up. The individual grid segments are formed on these blocks 18 as they progress along one leg of the oval with the remainder of the track 16 being utilized to return the blocks 18 to the starting position (START) of the process. At the starting position (START), the forming blocks 18 enter closely under a plate 35 and receive a first row of filaments 8a which are payed out from spools 10. The plate 35 keeps the filaments and wires in place. As they move along the track, the blocks 18 subsequently receive rows of wires 4 from the spools 4s and finally more filaments 8b from spools 11. Between the laying of each successive row of filaments 8 or wires 4 and between each series of spools, operations are performed by the blocks 18 which cause gathering of the wires 4 into the desired shape. The wires and filaments are arranged to overlie and crisscross one another prior to entering the oven 36. The precise details of these operations will be described hereafter in conjunction with a discussion of the winding and gathering sequence (A–J) depicted in FIGS. 5 and 6. The strip moves into the oven 36 where the metal wires 4 are heated and the thermoplastic coating 12 on the filaments 8 softened. Hot and soft, the respective wires 4 and coated filaments emerge from the oven 36 and pass beneath a press 38 which forces the hot wires into the soft plastic and unites them. A continuous strip of grids emanating from the press 38 passes up and over roller 48 and after trimming is ready for pasting. Since the other battery plate making steps are not a part of this invention, the strip is depicted as being accumulated on takeup reel 50. It is understood, however, that uninterrupted continuous pasting, curing, etc. of a continuous strip of grids is one of the benefits of this invention. To get the process under way the ends of the wires and filaments are fixed to the lead block which begins pulling out lengths of the material. After this is done the wires and filaments pay out continuously. FIGS. 5 and 6 graphically depict the stages A–J through which the processing blocks 18 pass between the points marked (START) and (FINISH) on FIG. 3 as well as the relationship between the wires 4, filaments 8, pilot 22 and gathering pins 24 at each stage. At stage A, an empty block 18 enters closely under plastic plate 35 such that the pilot pins 22 all but touch the bottom of the plate 35. At stage B, filaments 8a feed from the spools 10 onto the moving blocks 18 and between the pilot pins 22, as best shown in FIG. 6. At this point, the gathering pin 24 and slide 26 are in a forward position near the top of the block 18. As the block 18 advances from stage B to stage C camming means (not shown) drive the slide 26 and gathering pin 24 downwardly in the track 28 with the pin 24 gathering all the filaments 8a in its path to the bottom of the block 18 (stage C). With the filaments 8a gathered about the pin 24 at the bottom of the block 18, a first row of metal wires 4 are laid between the upper set of pilot pins 22, as shown at stage D. As the block 18 advances between stages D and E another camming means (not shown) drives the slide 26 and gathering pin 24 upwardly to again traverse the block through the track 28 and in so doing return the filaments 8a to their original position across the block and at the same time gather the metal wires 4 to the top of the block 18. At the top of the block 18, the wires 4 are partially

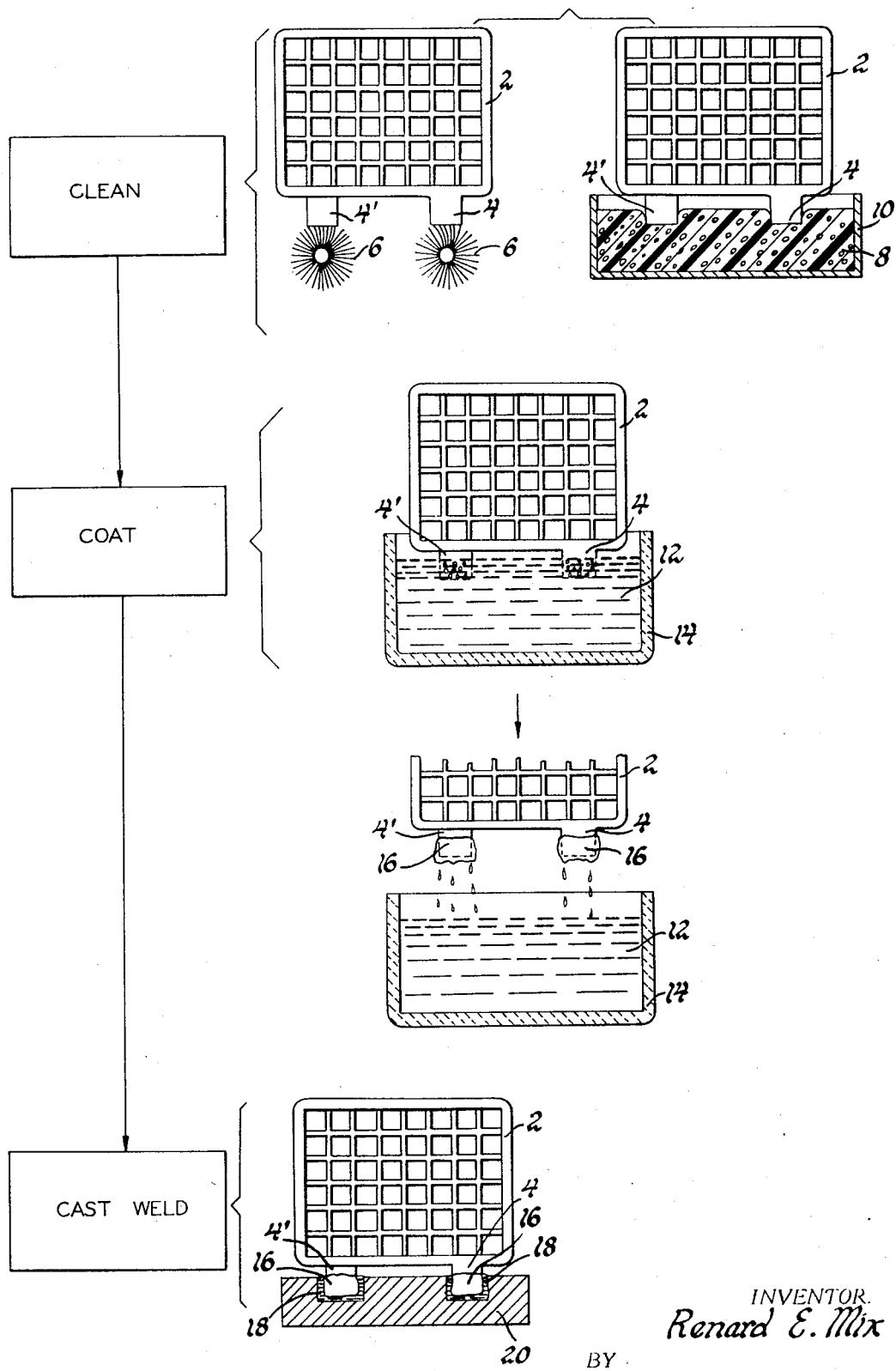

CASTING PLATE STRAPS TO BATTERY PLATES

High production rates call for processes which can be carried out automatically over a broad range of operating conditions and with a minimum amount of closely controlled process parameters. The cast-on method for forming battery plate straps has heretofore required close supervision if consistently reliable welds were to be produced automatically and at acceptable production rates. The basic process and variations thereon have been known for many years.

It is an object of this invention to relax the controls required and to broaden the process parameters to a point where a high yield of reliably bonded cell groups can be produced on automated equipment, especially as these parameters relate to plate cleanliness, plate temperature, plate strap material and plate strap mold temperatures.

This object is accomplished by providing a molten film of a low melting point lead alloy on that portion (i.e., a lug) of the plate which is to be joined with the plate strap material. The coated lug is immersed in molten plate strap material while the film is still molten. This film is comprised of a material having a melting point of at least about 200° F. below the melting point of the plate lug.

In conjunction with the attached drawing, the following is a more detailed discussion of the process of this invention. The left side of the drawing shows the three basic steps involved in this process. The right side of the drawing graphically depicts the process. A battery plate 2 is provided with a lug 4. The active material or paste is not shown. A number of alternately spaced positive and negative plates with separators therebetween form a cell group which ultimately forms one cell of the finished battery. 4' indicates the lug of a negative plate when the plate 2 is a positive. The specific shape of the plate is not particularly significant and may have any shape such as that disclosed in copending application Ser. No. 780,068, entitled "Battery Plate Grid," filed Nov. 29, 1968, now U.S. Pat. No. 3,556,854, in the name of Wheadon et al. and assigned to the assignee of this invention. Regardless of the precise shape of the plate 2, it need only have a weldable portion (e.g., lug 4) adapted to be joined to plate straps for joining the respective positive and negative plates together into a single cell group. In a lead acid storage battery, the lug 4 would normally be comprised of lead or a lead alloy and containing antimony or calcium and possibly some arsenic or tin. These alloying ingredients are provided to give strength to the lead and to impart better flowability or castability to the lead melt. Similarly, the plate strap material would also comprise principally lead with small amounts of these other alloying ingredients.

The lugs 4 are cleaned to increase their wettability and insure good reliable bonds. Cleaning removes any foreign matter on the lugs including any accumulated oxides. A preferred form of cleaning the Pb-alloy lug 4 comprises an initial brushing with rotary brushes 6 which need only contact the ends of the lugs 4 and penetrate between the several lugs to a depth of about ⅛ inch. This is preferably followed by a fluxing operation which removes oxides by dissolution or reducing them to their basis metal. In a preferred form the ends of the slugs 4 are contacted by a sponge 8 saturated with flux which is held in an open pan 10 and raised into contacting position when the inverted lugs 4 pass over a fluxing station. The ends and first ⅛ inch or so of the lugs 4 are fluxed. In a preferred embodiment, the flux comprises an aqueous solution of stannous chloride and a wetting agent. An alternative flux comprises rosin dissolved in alcohol or weak ammonium or sodium hydroxide with or without a wetting agent.

After cleaning, the lugs 4 are dipped into a melt 12 of a lead alloy having a melting point at least about 200° F. less than the melting point of the lugs 4. The melt comprises lead alloys which are metallurgically and electrochemically compatible with the Pb-acid system. Thus the alloys should not be so readily oxidized as to interfere with subsequent bonding and should not contain elements which tend to set up stray currents or promote self-discharge of the cell. The melt drives off the flux solvent and wets the lug 4. The lug 4 is held in the melt 12 long enough for a solid-liquid type diffusion bond to be formed over the wetted surface and for the lug 4 to pick up enough heat to retain a film of the alloy 12 molten until the casting step. Generally, any low melting point lead-rich alloy which is metallurgically and electrochemically compatible with the other constituents of the cell and which melts at a temperature somewhere below about 350° F. is acceptable, whether that alloy be binary, ternary or otherwise. It is preferred that the alloy 12 have a melting point less than about 320° F. In this regard, lead-bismuth-tin alloys are particularly useful since they are not readily oxidized in this environment, produce an excellent bond and do not appear to effect the electrochemistry of the finished battery. Any of a number of compositions are available in the Pb-Bi-Sn system by properly proportioning the percentages of lead, bismuth and tin in the ranges of about 20 percent to about 70 percent bismuth, 20 percent to about 75 percent tin, and the balance lead. It is especially preferred to use alloys containing as much lead as possible and which have a tin to bismuth ratio of about 0.8 to 1. Though some possible candidates for the alloy 12 will be less desirable than others, other acceptable alloys can be selected from appropriate metals handbooks and accordingly are not endlessly repeated here. The alloy 12 is maintained in a molten condition in a tray 14 which is raised and lowered to contact the lugs 4 with the alloy 12. The alloy 12 is maintained in the tray 14 at a temperature substantially above its melting point and preferably between about 400° F. to about 600° F. with about 450° F. being most preferred. The use of these higher temperatures insures sufficient heat retention in the lug that the film 16, formed on the lug, will remain in the molten state at the time the lug 4 is immersed into the strap-forming material 18 in a subsequent operation. In this regard, the lug 4 is immersed in the alloy 12 for a sufficient time for the lug 4 to pick up enough heat which, in combination with the heat in the film 16, maintains the molten condition. Though some of the flux solvent is vaporized while the plate is in transit to the alloy melt 12, the remainder is driven off in the alloy melt 12. The solvent vapor rises as bubbles through the melt 12 along the surface of the lugs 4. To minimize bubbles, forced air can be passed over and through the lugs between the fluxing and the coating station operations to accelerate solvent vaporization. In the alternative, a solvent having a high vapor pressure may be used.

While in the melt 12 a solid-liquid diffusion bond or joint occurs at the interface between the melt 12 and the melt-wetted lugs 4. Like any metallurgical treatment, there is a time-temperature relation which dictates the precise composition of the thus formed joint upon solidification. Metallographically, a sharp change in alloy composition can be seen at this joint. The term "solid-liquid diffusion joint" is used to characterize this joint which is formed when the high melting point, solid lug is held in contact with the low melting point liquid alloy 12 such that some Bi and Sn will diffuse into the surface of the lug and some of the lug surface will dissolve in the alloy 12.

When removed from the melt 12 a thin film 16 of molten alloy 12 clings to the lugs 4. In this condition, the cell group is rapidly transferred to a plate strap casting station where the lugs are immersed into a mold 20 filled with molten-strap-forming material 18. Like the lug 4, the strap-forming material 18 consists essentially of Pb with some strength and some flow improvers such as Ca, Sb, Sn, and/or As added. The immersion occurs while the film 16 is in the molten state in order to provide a liquid-liquid interface between the plate strap material 18 and the film 16. Film 16 compositions of electrochemically compatible lead alloys which are molten immediately on contact with the strap-forming material are considered part of this invention. The coated surface of the lugs 4, provided by the film 16, causes instant wetting by the plate-strap 18. The miscibility of the film and the plate-strap materials at their liquid-liquid interface causes a virtually seamless joint which is rich in bismuth and tin on the film side and which fades asymptotically with respect to Bi and Sn on the strap side. The term "liquid-liquid diffusion joint" is used to characterize this joint. The film 16 tends to wipe back somewhat as the lug 4 is immersed into the fused plate strap material 18. This causes a somewhat thinner film 16 at the lug tip than at a portion of the lug closer to the plate 2.

The plate-strap lead alloy melts around 580° F. and is heated in a separate pot to about 900°±25° F. The lead 18 is introduced into the mold 20 at about this temperature. The mold 20 temperature varies between about 300° F. and about 500° F. By the time the mold 20 is filled and the ends of the lugs 4 contact the surface of the molten lead melt 18 the melt's temperature has dropped to about 800° F. After the lugs 4 have been immersed into the molten lead 18 the melt temperature drops faster owing to the heat sink effect of the lugs 4 and plates 2. The melt 18 is allowed to cool until solidification occurs at which time the strap is ejected from the mold by appropriate ejector means, not shown.

The solidified product comprises three separate regions or layers in which the lug alloy forms one layer, the low melting alloy the second layer, and the plate strap alloy the third layer. The low melting alloy is bonded to the lug through a joint resulting from the diffusion and dissolution occurring at the solid-liquid interface during the film-forming dip. Metallographically there is a rather sharp alloy composition change at this joint. Contrariwise, the joint between the film and the plate strap material results from a combination of miscibility of the film with the plate strap material and diffusion of the respective materials one into the other resulting in a metallographically less distinct alloy composition change. Some further diffusion of the film forming alloying constituents into the lug material occurs during the casting step.

In a specific example of this process, the lug 4 comprises about 6 percent antimony, about 0.6 percent arsenic and about 0.45 percent to about 0.75 percent tin and the balance lead. This alloy melts at about 550°±5° F. The low melting point alloy 12 comprises about 33 percent bismuth, about 27 percent tin and the balance lead and melts at about 278° F. The alloy 12 is maintained in the tray 14 at a temperature of about 450° F. The plate-strap-forming alloy 18 contains about 3 percent antimony, about 0.1 to about 0.5 percent tin and about 0.05 percent to about 0.3 percent arsenic and melts at about 580°± about 5° F. The plate-strap material 18 is heated to 925° F. in a pot and held ready for casting into the mold 20 which is held at about 400° F. The flux in the sponge 8 comprises an aqueous solution of stannous chloride and a wetting agent. The lugs 4 are cleaned and fluxed for about 15 seconds. The cell group is then realigned to insure proper placement of the plates, separators and lugs. The realignment takes about 15 seconds. In the next 13 seconds the cell group is inverted with the lugs facing downwardly and is ready for the coating step. The lugs are next immersed in the alloy 12 for about 7 secs. which is sufficient time to drive off any flux solvent, activate the flux and permit the alloy 12 to wet and bond to the lug 4. The lug temperature raises to about 300° F. In the next 5 seconds the lugs are removed from alloy melt 12 and prepared for immersion into the plate strap material 18. In this interval the film 16 of low melting alloy 12 is kept molten by the retained heat in the film 16 and the lugs 4. The lugs 4 are next plunged into the melt 18. This plunging takes about 0.4 second to immerse the desired amount (about one-half of the lug 4 in the melt. The melt 18 is introduced into a 400° F. mold 20 at a temperature of about 925° F. By the time the ends of the lugs 4 contact the melt 18 this temperature has fallen to about 800° F. and, by the time the lugs are completely immersed, to about 750° F. The casting cools for about 15 seconds and is ejected and the process repeats itself.

While I have described my invention primarily in terms of specific embodiments thereof, I do not intend to be limited thereto except to the extent hereinafter set forth.

I claim:

1. In the method of casting a lead alloy battery plate-strap and concurrently welding lead alloy battery plate lugs thereto including the principal steps of cleaning the lugs to substantially free them from lead oxides, immersing the lugs into a mold containing superheated strap alloy and allowing the strap alloy to weld to the lugs and solidify in the mold before removal from the mold, the improvement comprising:

immersing the lugs into a pool of coating lead alloy which melts at least about 200° F. lower than the lugs melt and which is superheated to a temperature less than that of the superheated strap alloy;

heating the lugs in the superheated coating lead alloy to a temperature above that at which the coating lead alloy melts but below that at which the lug melts to form a solid-liquid diffusion joint between the lug and coating alloys and to provide sufficient heat in the lugs to prevent a film of the coating alloy from solidifying on the lugs during the time interval between withdrawal of the lugs from the pool of coating alloy and their immersion into the strap alloy in the mold;

withdrawing the heated lugs from the superheated coating alloy while retaining a film of coating alloy on the surface of the lugs; and quickly immersing the film-coated lugs into the superheated strap alloy before the melt alloy film solidifies on the surface of the lugs;

whereby the strap alloy rapidly wets the film-coated lugs, a liquid-liquid diffusion joint forms between the film and strap alloys, and heat from the strap alloy is rapidly conducted into the lug for welding of the lug and the strap together prior to solidification of the strap in the mold.

2. The process according to claim 1 in which said pool is maintained at a temperature of about 400° to 600° F. and is selected from the group consisting of lead-bismuth-tin alloys melting below about 320° F. and in the range of 20–70 percent bismuth, 20–75 percent tin and the balance lead.

3. The process according to claim 2 in which said pool is maintained at a temperature of about 450° F. and comprises lead, bismuth and tin in about eutectic proportions.

* * * * *